US010642468B2

(12) United States Patent
Guido et al.

(10) Patent No.: US 10,642,468 B2
(45) Date of Patent: May 5, 2020

(54) ACCESSIBILITY LOCK AND ACCESSIBILITY PAUSE

(71) Applicant: salesforce.com, inc., San Francisco, CA (US)

(72) Inventors: Robin Guido, San Francisco, CA (US); Joseph Andolina, Castro Valley, CA (US)

(73) Assignee: salesforce.com, Inc., San Francisco, CA (US)

( * ) Notice: Subject to any disclaimer, the term of this patent is extended or adjusted under 35 U.S.C. 154(b) by 103 days.

(21) Appl. No.: 15/872,679

(22) Filed: Jan. 16, 2018

(65) Prior Publication Data
US 2019/0220177 A1 Jul. 18, 2019

(51) Int. Cl.
*G06F 3/0484* (2013.01)
*G06F 16/93* (2019.01)
*G06F 16/176* (2019.01)
*G06F 40/166* (2020.01)
*G06F 40/197* (2020.01)

(52) U.S. Cl.
CPC ...... *G06F 3/04847* (2013.01); *G06F 3/04842* (2013.01); *G06F 16/1774* (2019.01); *G06F 16/93* (2019.01); *G06F 40/166* (2020.01); *G06F 40/197* (2020.01)

(58) Field of Classification Search
CPC .. G06F 3/04847; G06F 3/04842; G06F 16/93; G06F 16/1774; G06F 17/24; G06F 40/166; G06F 40/197
See application file for complete search history.

(56) References Cited

U.S. PATENT DOCUMENTS

| 5,983,227 | A  | 11/1999 | Nazem et al.    |
|-----------|----|---------|-----------------|
| 6,216,133 | B1 | 4/2001  | Masthoff        |
| 6,236,978 | B1 | 5/2001  | Tuzhilin        |
| 6,288,717 | B1 | 9/2001  | Dunkle          |
| 6,411,949 | B1 | 6/2002  | Schaffer        |
| 6,907,566 | B1 | 6/2005  | McElfresh et al.|
| 7,062,502 | B1 | 6/2006  | Kesler          |

(Continued)

OTHER PUBLICATIONS

John Gerard Schoeberlein and Yuanqiong Wang, Usability Evaluation of an Accessible Collaborative Writing Prototype for Blind Users, Nov. 2014, Journal of Usability Studies, vol. 10, Issue 1, pp. 26-45. (Year: 2014).*

(Continued)

*Primary Examiner* — Andrew T Chiusano
(74) *Attorney, Agent, or Firm* — LKGlobal | Lorenz & Kopf, LLP

(57) ABSTRACT

A computer-implemented method in a document editing module is provided. The document editing module comprises a processor configured by programming instructions encoded in non-transient computer readable media. The method comprises providing, by the processor, contents of a document to a user interface; providing via the user interface, by the processor, an object that when selected indicates a desire to lock the document from editing by another document editing module or another instance of the document editing module for a fixed time period; and modifying, by the processor, one or more attributes of the document that indicate that the document is locked for editing and a fixed length of time the document is locked for editing when the object has been selected.

20 Claims, 8 Drawing Sheets

(56) References Cited

U.S. PATENT DOCUMENTS

| | | |
|---|---|---|
| 7,100,111 B2 | 8/2006 | McElfresh et al. |
| 7,269,590 B2 | 9/2007 | Hull et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,644,122 B2 | 1/2010 | Weyer et al. |
| 7,668,861 B2 | 2/2010 | Steven |
| 7,747,648 B1 | 6/2010 | Kraft et al. |
| 7,827,208 B2 | 11/2010 | Bosworth et al. |
| 7,853,881 B1 | 12/2010 | Aly Assal et al. |
| 7,856,445 B2 | 12/2010 | Gross |
| 7,945,653 B2 | 5/2011 | Zuckerberg et al. |
| 7,991,764 B2 | 8/2011 | Rathod |
| 8,005,896 B2 | 8/2011 | Cheah |
| 8,073,850 B1 | 12/2011 | Hubbard et al. |
| 8,086,960 B1 * | 12/2011 | Gopalakrishna ...... G06F 16/986 715/266 |
| 8,103,611 B2 | 1/2012 | Tuzhilin et al. |
| 8,150,913 B2 | 4/2012 | Cheah |
| 8,166,013 B2 | 4/2012 | Bandaru et al. |
| 8,812,946 B1 * | 8/2014 | Kopylov ............. G06F 17/2247 715/202 |
| 9,875,269 B1 * | 1/2018 | Doak ................. G06F 16/2343 |
| 2008/0010270 A1 | 1/2008 | Gross |
| 2008/0147487 A1 | 6/2008 | Hirshberg |
| 2008/0209320 A1 | 8/2008 | Mawhinney et al. |
| 2010/0070872 A1 * | 3/2010 | Trujillo ............... G06F 3/04892 715/745 |
| 2010/0125502 A1 | 5/2010 | Solomon et al. |
| 2010/0217757 A1 | 8/2010 | Fujioka |
| 2010/0241576 A1 | 9/2010 | Beeri |
| 2011/0209067 A1 | 8/2011 | Bogess et al. |
| 2011/0258204 A1 | 10/2011 | Hubbard et al. |
| 2012/0290407 A1 | 11/2012 | Hubbard et al. |

OTHER PUBLICATIONS

Final Office Action for U.S. Appl. No. 12/437,418, dated Apr. 16, 2012.

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

* cited by examiner

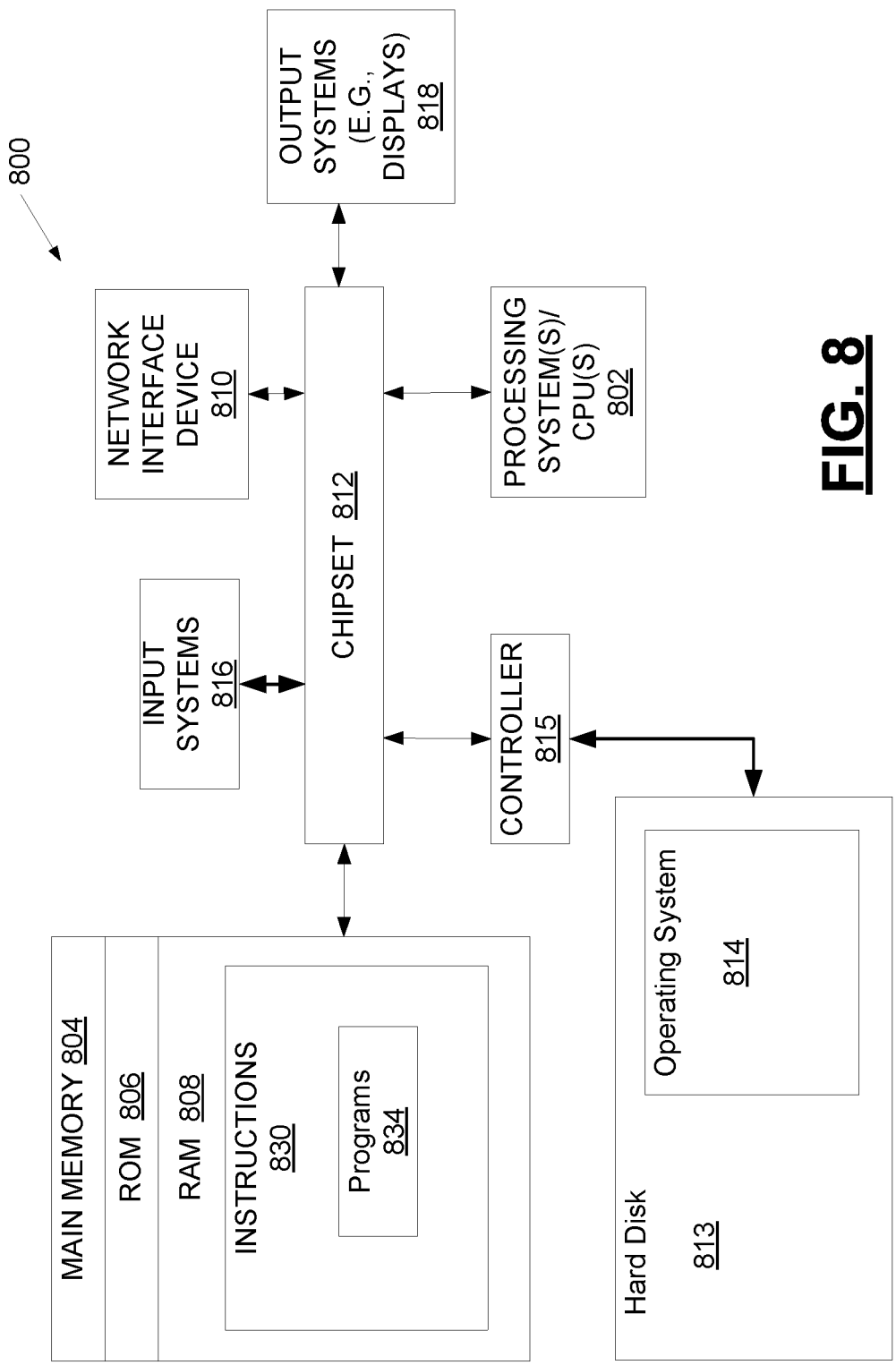

ACCESSIBILITY LOCK AND ACCESSIBILITY PAUSE

TECHNICAL FIELD

Embodiments of the subject matter described herein relate generally to computer systems, and more particularly to techniques for controlling document access in a computer system.

BACKGROUND

Many organizations use collaborative application software such as real-time collaborative editing (RTCE) platforms that allow multiple users to engage in live, simultaneous and reversible editing of a single file (e.g., a document). Examples of RTCE platforms include Quip and Google Docs.

Some users, such as a user who may be visually impaired, illiterate, or possess a learning disability, may need assistive technology such as a screen reader to allow the user to utilize application software. A screen reader can be a type of application software that attempts to convey what is displayed on a visual display using non-visual means such as text-to-speech or a Braille device.

When reading and/or editing a document using a screen reader, the user may not be notified of simultaneous changes made in the document above the user's current position in the document if the document is accessible via a RTCE platform. A screen reader utilizing user may have a mistaken view of the contents of a document due to simultaneous changes made to the document while the screen reader utilizing user is accessing the document.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 8 is a schematic block diagram of an example computer system, in accordance with some embodiments.

DETAILED DESCRIPTION

Disclosed herein are systems and methods for providing an accessibility lock and/or accessibility pause to a collaborative document (e.g., a document that is accessible by a real-time collaborative editing (RTCE) platform such as Quip or Google Docs). The subject matter described herein discloses apparatus, systems, techniques and articles for applying a time-based lock (e.g., accessibility lock) on a collaborative document. The accessibility lock can provide a user with exclusive editing rights to the document for a period of time (e.g., accessibility lock period) and can alert other team members when someone using an accessibility tool (such as a screen reader) is accessing (e.g., editing) the document. The accessibility lock period can be adjustable and can be extended. The adjustment/extension of the accessibility lock period may be made by voice commands or other screen reader interactions.

The subject matter described herein also discloses apparatus, systems, techniques and articles for applying a time-based pause function (e.g., accessibility pause) on a collaborative document. The accessibility pause, while not providing exclusive editing rights to a user, can delay and save collaborative changes to a collaborative document in a queue for a period of time (e.g., accessibility pause period) while the user accesses the document and stream the saved collaborative changes to the user for acceptance, rejection or editing when the user is ready to receive and/or review the changes.

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
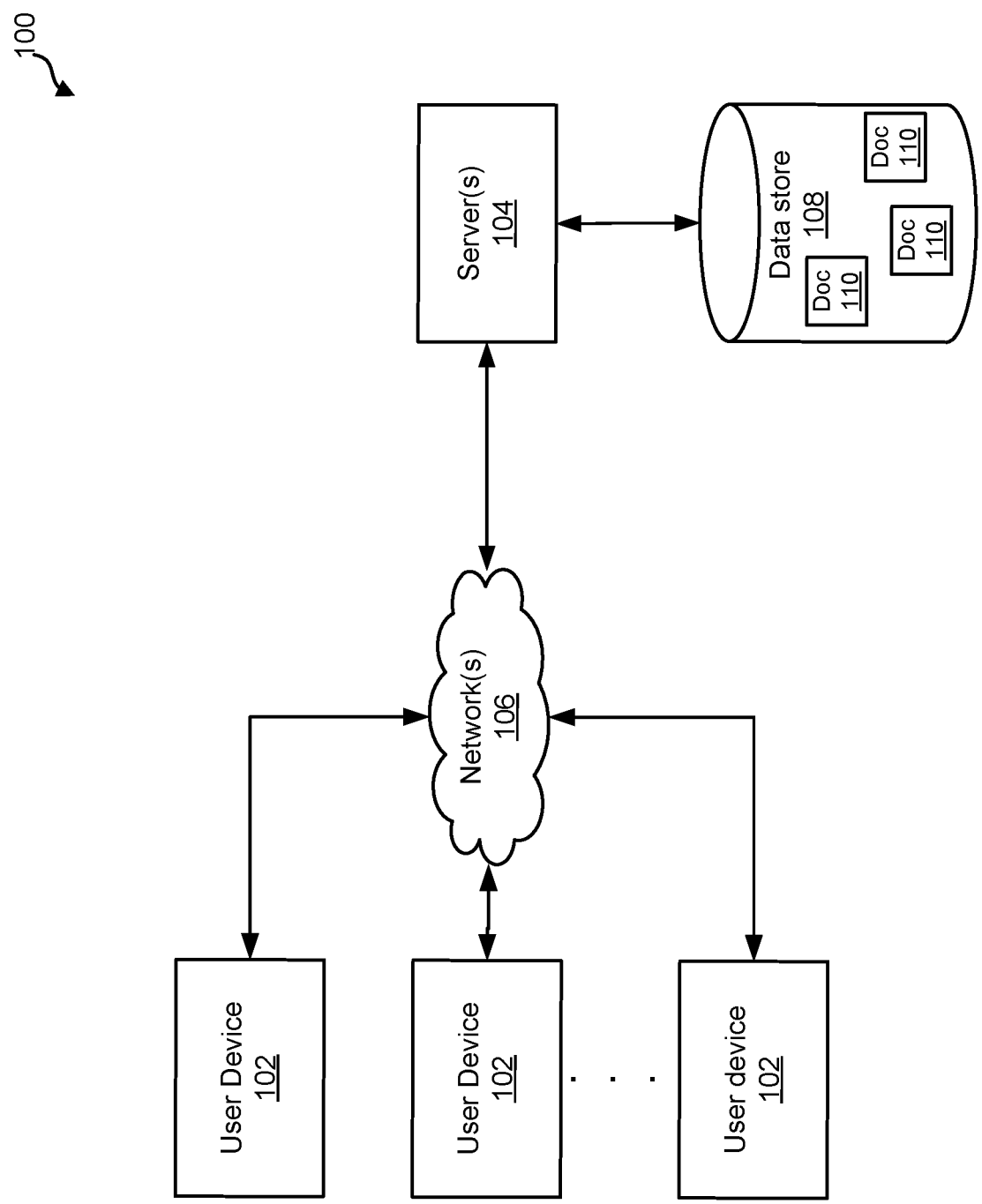
FIG. 1 is a block diagram depicting an example computing environment that can be used to implement aspects of the current subject matter, in accordance with some embodiments.

FIG. 1 is a block diagram depicting an example computing environment 100 that can be used to implement aspects of the current subject matter. The example system includes one or more user or client devices 102 (e.g., computers) that communicate with one or more servers 104 via one or more networks 106. The server 104 is coupled to a data store 108 that may store documents 110 that may be requested by a client device 102. The client device 102 may initiate an application (e.g., client-side application) that executes on the client device 102 to create, edit, print, save, etc. documents 110 stored in the data store 108. The client device 102 may also access, for example via a web interface, an instance of an application (e.g., server-side application) that executes on the server 104 to create, edit, print, save, etc. documents 110 stored in the data store 108. The document may include any of a number of different document types including but not limited to word processing files, spreadsheet files, and others. The application (server-side or client-side) may include any of a number of different application types such as document readers, document editors, screen readers and others.

The example computing environment 100 also includes an accessibility module that is configured to work cooperatively with applications that may access a collaborative document. The accessibility module is configured to allow a user to lock and/or pause a collaborative document.

In one example scenario, a first user, such as a visually impaired user, who is accessing a collaborative document via a user interface such as a screen reader, may desire to prevent a second user from making edits to the collaborative document while the first user is editing the document. Without the accessibility module, the second user may edit an earlier section of the document while the first user is accessing a later section of the document. After completing its access to the document, the first user may be left with a false view of the state of the document because the screen reader may not make the first user aware that the earlier section has or is being edited by the second user.

The example accessibility module can allow the first user to lock the document from edits for a lock period (e.g., a first pre-determined period of time) to allow the first user to access the document without the document changing during the first user's access time. By locking the document from edits, no edits can be made or entered in the document during the lock period. The example accessibility module can also alert other team members of the identity of the user applying the accessibility lock or that the user applying the accessibility lock is using a screen reader. The lock period may be adjustable and may be extended, for example, via voice commands or other screen reader interactions.

The example accessibility module can also allow the first user to pause the document from edits for a pause period (e.g., a second pre-determined period of time) to allow the first user to access the document without the document changing during the first user's access time. By pausing the document from edits, no edits will be entered in the document during the pause period. A second user may enter edits that are stored in a queue during the pause period. After the pause period has been terminated or expired, the edits that are stored in the queue may be automatically entered into the document or selectively entered based on selection choices made by the first user if the first user is still accessing the document after the end of the pause period.

The example accessibility module may utilize an audible notification to notify the first user that changes have been made. After notification, the first user may enter a reviewing mode to review the edits and have the edits stored in the queue read out. Then if the user chooses, the user may jump to the place in the document where the changes have been made.

The example accessibility module can be implemented as a plug-in to many different types of applications (client-side or server-side) that provide access to the documents 110. The example accessibility module may also be implemented as a standalone application. The techniques described herein are applicable to an accessibility module implemented as an extension to an application as well as to a standalone application.

Figure 2:
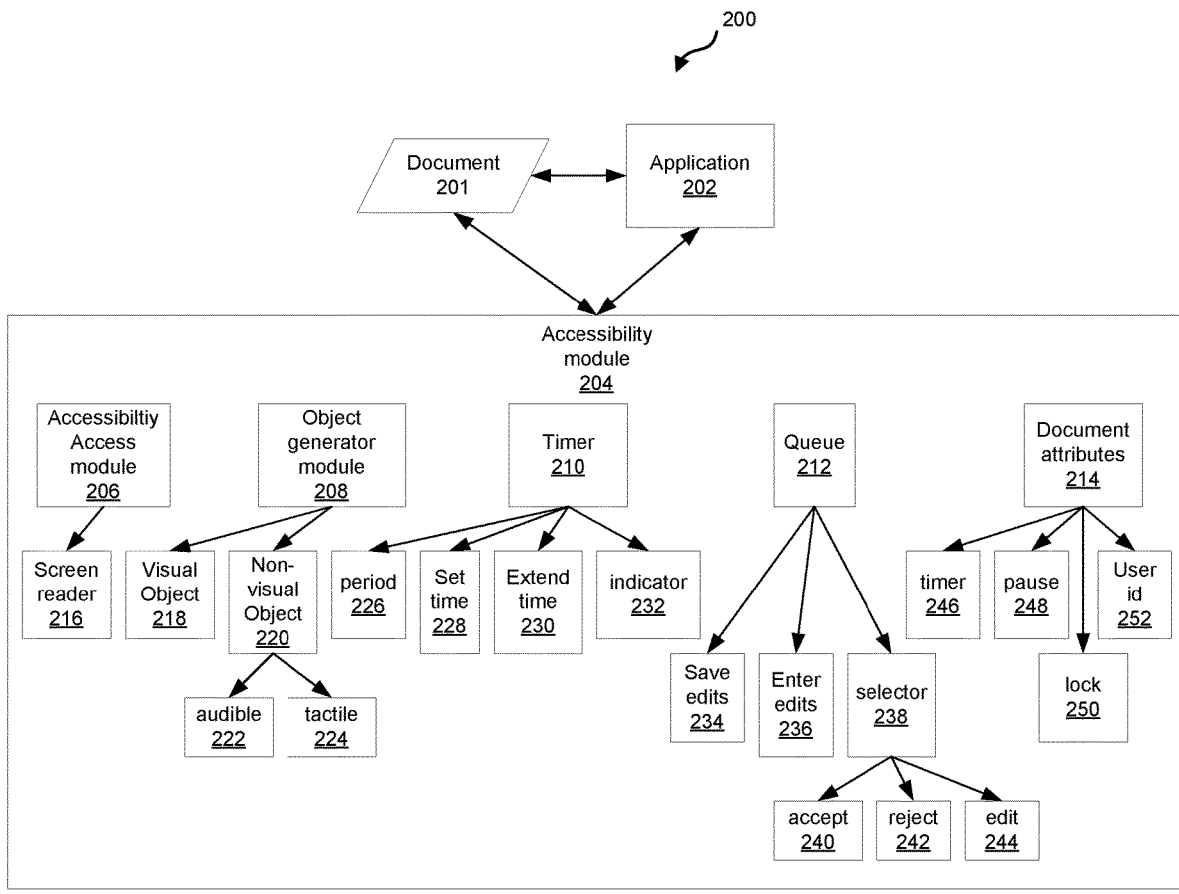
FIG. 2 is a block diagram depicting an example computing system that utilizes an example accessibility module, in accordance with some embodiments.

FIG. 2 is a block diagram depicting an example computing system 200 that utilizes an example accessibility module 204. An example document 201 may be accessed by an example application 202 in the example computing system 200. A user accessing the document 201 using the application 202, may invoke the accessibility module 204 to apply an accessibility lock or accessibility pause to the document 201. The example accessibility module 204 comprises one or more processors configured by programming instructions. The example accessibility module 204 includes an accessibility access module 206, an object generator module 208, a timer 210, a queue 212, and document attributes module 214. The example accessibility access module 206 is configured to interface the accessibility access module to various types of applications 202 such as a screen reader 216.

The example object generator module 208 is configured to provide an object in the form of a visual indicator 218 (e.g., button, icon, etc.) on a display screen and a non-visual indicator 220 such as an audible indicator 222 (e.g., text-to-voice indicator or tone indicator) or a tactile indicator 224 (e.g., braille indicator) for selection by a user when choosing to apply an accessibility lock or accessibility pause to the collaborative document.

The example timer 210 is configured to provide a counter 226 for a timed lock or pause period, provide a module 228 to set the length of the timed (lock or pause) period, provide a module 230 configured to allow a user to extend the timed period, and provide a module 232 configured to provide an indication of the remaining amount of time in the timed period to the application before the timed period expires so that a user can exercise the option to extend the timed period if so desired.

The example queue 212 is configured to provide storage space 234 to save proposed edits during an accessibility pause, a module 236 configured to enter edits saved by the queue into a paused document at the conclusion of the pause period, and a selector module 238 configured to present a user with selection options for handling paused edits that were saved by the queue. The options include an accept option 240 configured for accepting the edits, a reject option 242 configured for rejecting the edits, and an edit option 244 configured for editing saved edits.

The example document attributes module 214 is configured to set document attributes relating to the lock or pause status of a collaborative document. The document attributes module 214 is configured with a timer attribute module 246 configured to set an attribute that indicates how long a document is paused or locked, a pause module 248 configured to set an attribute that indicates that a document is paused, a lock module 250 configured to set an attribute that indicates that a document is locked, and a user id module 252 configured to set an attribute that indicates the user who locked or paused a document or that the user is using an accessibility application such as a screen reader to access the locked or paused document.

The setting of the document attributes is an example of a way to lock or pause the document for editing. An application (e.g., a second document editing module or a second instance of a document editing module) attempting to open a collaborative document can first check the attributes.

If the lock attribute is set, then the application will know that the document is locked for editing and should not be opened for editing. The timer attribute can let the application know the fixed length of time the document is locked for editing. The user id attribute can let the application know who locked the document and/or that a user using an accessibility application such as a screen reader locked the document. The one or more attributes of the document may be stored as part of the document, for example, as metadata or in a file separate from the document.

If the pause attribute is set, then the application will know that the document is paused for editing and that proposed edits will be saved in a queue. The timer attribute can let the application know the fixed length of time the document is paused for editing. The user id attribute can let the application know who paused the document and/or that a user using an accessibility application such as a screen reader paused the document.

Figure 3:
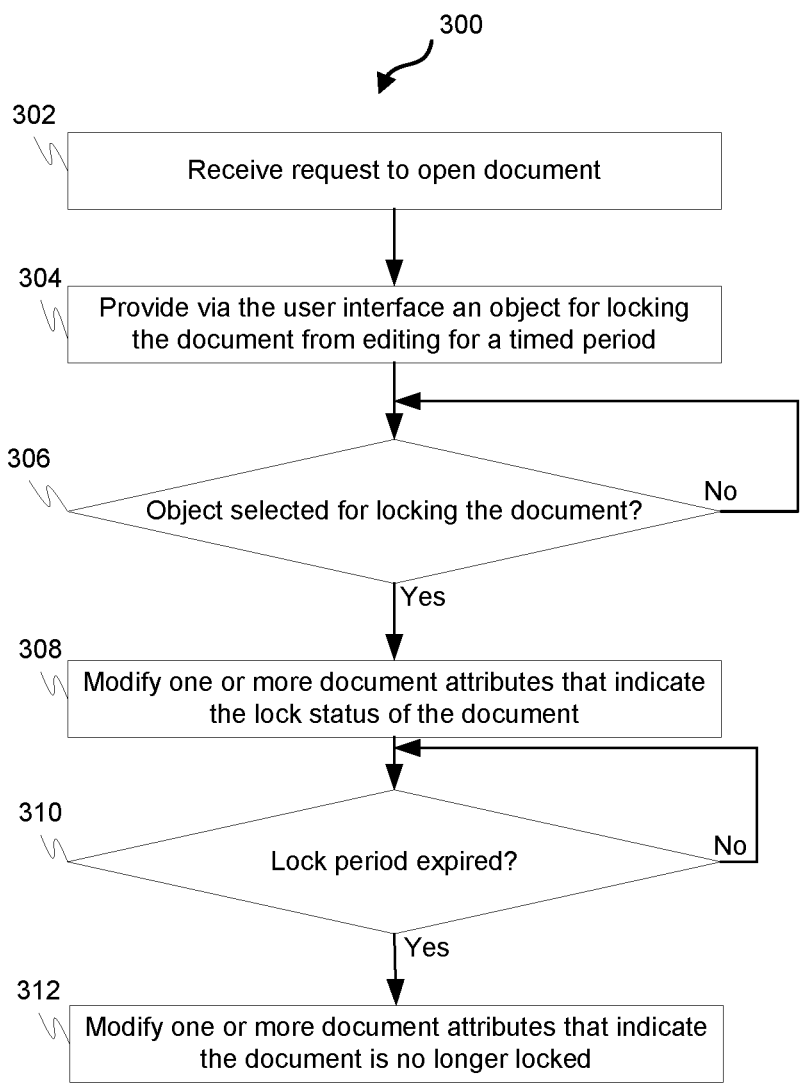
FIG. 3 is a process flow chart depicting an example process performed in an example computing system when an accessibility lock is applied, in accordance with some embodiments.

FIG. 3 is a process flow chart depicting an example process 300 performed in an example computing system when an accessibility lock is applied. The order of operation within the example process 300 is not limited to the sequential execution as illustrated in the figure, but may be performed in one or more varying orders as applicable and in accordance with the present disclosure.

The example process 300 may begin when a request to open a collaborative document is received (operation 302). An accessibility lock, however, can be initiated at other times while the document is opened and not only at the time when the document is first opened. An application may be invoked to provide a user with access to the collaborative document and an accessibility module may also be invoked. The application may provide the contents of the document to a user interface. The user interface may include a screen for visually viewing the document and/or a screen reader for reading the document displayed on the screen to the user.

An object for selection by the user may be provided via the user interface for locking a collaborative document from editing by others for a timed period (operation 304). If, for example, the application comprises an accessibility application such as a screen reader the accessibility module may provide an object in the form of a non-visual indicator such as an audible indicator or a tactile indicator for selection by a user when choosing to apply an accessibility lock to the collaborative document.

A decision is made regarding whether the object is selected (decision 306). If the object is not selected (no at decision 306), the example process waits for the object to be selected. When the object is selected (yes at decision 306), one or more document attributes are modified that indicate that the document is locked for editing (operation 308). The document attributes may include an attribute that indicates that the document is locked. The document attributes may also include an attribute that indicates the lock period (e.g., fixed length of time the document is locked for editing). The document attributes may further identify the user who locked the document and/or that the user who locked the document is accessing the document via an accessibility application such as a screen reader.

A determination is made regarding whether the lock period has expired (decision 310). If the lock period has not expired (no at decision 310), the document remains locked and the process continues to wait until the lock period expires. When the lock period has expired (yes at decision 310), then the one or more document attributes are modified to indicate that the document is no longer locked for editing (decision 312). The lock period may expire due to the expiration of a timer tracking the lock period or may be terminated prior to the expiration of the timed period by action by the user.

The setting of the document attributes is an example of a way to lock the document for editing. An application (e.g., a second document editing module or a second instance of a document editing module) attempting to open a collaborative document can first check the attributes. If a lock attribute is set, then the application will know that the document is locked for editing and should not be opened for editing. A timer attribute can let the application know the fixed length of time the document is locked for editing. A user id attribute can let the application know who locked the document and/or that a user using an accessibility application such as a screen reader locked the document. The one or more document attributes may be stored as part of the document, for example, as metadata or in a file separate from the document.

Figure 4:
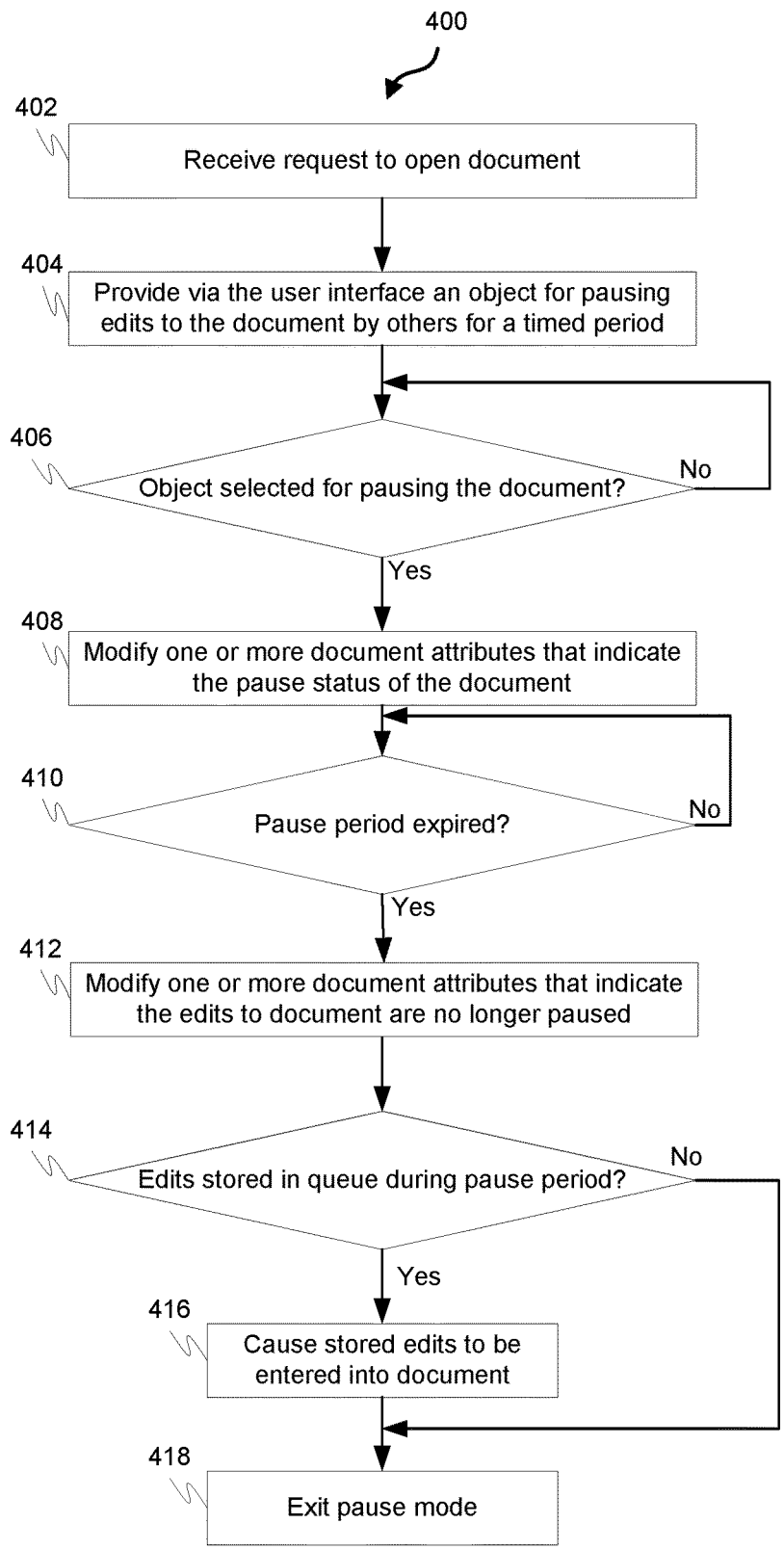
FIG. 4 is a process flow chart depicting an example process performed in an example computing system when an accessibility pause is applied, in accordance with some embodiments.

FIG. 4 is a process flow chart depicting an example process 400 performed in an example computing system when an accessibility pause is applied. The order of operation within the example process 400 is not limited to the sequential execution as illustrated in the figure, but may be performed in one or more varying orders as applicable and in accordance with the present disclosure.

The example process 400 may begin when a request to open a collaborative document is received (operation 402). An accessibility pause can be initiated at other times while the document is opened and not only at the time when the document is first opened. An application may be invoked to provide a user with access to the collaborative document and an accessibility module may also be invoked. The application may provide the contents of the document to a user interface. The user interface may include a screen for visually viewing the document and/or a screen reader for reading the document displayed on the screen to the user.

An object for selection by the user may be provided via the user interface for pausing edits to a collaborative document for a timed period (operation 404). If, for example, the application comprises an accessibility application such as a screen reader the accessibility module may provide an object in the form of a non-visual indicator such as an audible indicator or a tactile indicator for selection by a user when choosing to apply an accessibility pause to the collaborative document.

A decision is made regarding whether the object is selected (decision 406). If the object is not selected (no at decision 406), the example process waits for the object to be selected. When the object is selected (yes at decision 406), one or more document attributes are modified that indicate that the document is paused for editing (operation 408). The document attributes may include an attribute that indicates that edits to the document are paused. The document attributes may also include an attribute that indicates the pause period. The document attributes may further identify the user who paused edits to the document and/or that the user who paused edits to the document is accessing the document via an accessibility application such as a screen reader.

A determination is made regarding whether the pause period has expired (decision 410). If the pause period has not expired (no at decision 410), the document remains paused for edits and the process continues to wait until the pause period expires. If the pause period has expired (yes at decision 410), then the one or more document attributes are modified to indicate that the document is no longer paused for editing (operation 412). The pause period may expire due to the expiration of a timer tracking the pause period or may be terminated prior to the expiration of the timed period by action by the user.

A determination is made regarding whether proposed edits by others were stored in the queue during the pause period (decision 414). If proposed edits by others were stored in the queue during the pause period (yes at decision 414), then the stored edits are entered into the document (operation 416) and the pause mode is exited (operation 418). If proposed edits by others were not stored in the queue during the pause period (no at decision 414), then the pause mode is exited (operation 418).

The setting of the document attributes is an example of a way to pause edits to the document. An application (e.g., a second document editing module or a second instance of a document editing module) attempting to open a collaborative document can first check the attributes. If a pause attribute is set, then the application will know that the document is paused for editing and that proposed edits will be saved in a queue. A timer attribute can let the application know the fixed length of time the document is paused for editing. A user id attribute can let the application know who paused the document and/or that a user using an accessibility application such as a screen reader paused the document. The one or more document attributes may be stored as part of the document, for example, as metadata or in a file separate from the document.

Figure 5:
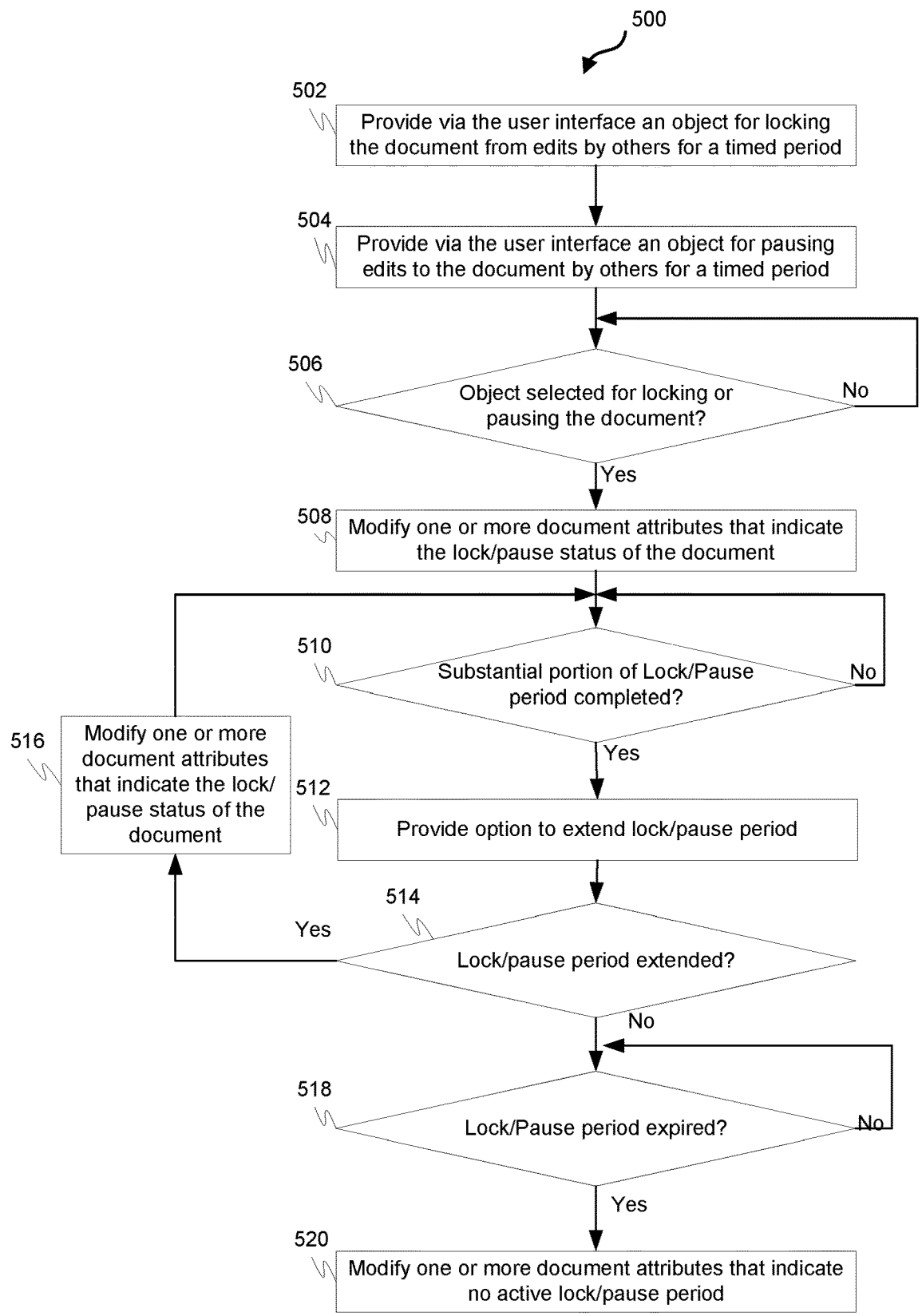
FIG. 5 is a process flow chart depicting an example process performed in an example computing system for an accessibility pause or an accessibility lock to be applied, in accordance with some embodiments.

FIG. 5 is a process flow chart depicting an example process 500 performed in an example computing system for an accessibility pause or an accessibility lock to be applied. The order of operation within the example process 500 is not limited to the sequential execution as illustrated in the figure, but may be performed in one or more varying orders as applicable and in accordance with the present disclosure.

An object for selection by the user may be provided via the user interface for locking a collaborative document from editing by others for a timed period (operation 502). If, for example, the application comprises an accessibility application such as a screen reader the accessibility module may provide an object in the form of a non-visual indicator such as an audible indicator or a tactile indicator for selection by a user when choosing to apply an accessibility lock to the collaborative document.

Another object for selection by the user may be provided via the user interface for pausing edits to a collaborative document for a timed period (operation 504). If, for example, the application comprises an accessibility application such as a screen reader the accessibility module may provide an object in the form of a non-visual indicator such as an audible indicator or a tactile indicator for selection by a user when choosing to apply an accessibility pause to the collaborative document.

A determination is made regarding whether an object has been selected for locking or pausing the document (decision 506). If no object has been selected for locking or pausing the document (no at decision 506), the process waits for an object to be selected. If an object has been selected for locking or pausing the document (yes at decision 506), then one or more document attributes are modified that indicate the lock/pause status of the document (operation 508).

A determination is made regarding whether a substantial portion of a Lock/Pause period (e.g., timed period) associated with the selected object has been completed (decision 510). If a substantial portion of a Lock/Pause period associated with the selected object has not yet been completed (no at decision 510), the process waits for a substantial portion of a Lock/Pause period associated with the selected object to be completed. If a substantial portion of a Lock/Pause period associated with the selected object has been completed (yes at decision 510), then an option to extend lock/pause period is provided (operation 512). This may involve providing to the user interface an indication of how much time remains in the timed period and/or providing the indication after at least half of the timed period has elapsed and prior to the expiration of the timed period. This may also involve providing to the user interface a selectable option to extend the timed period after providing the indication of how much time remains in the first timed period.

A determination is made regarding whether an option has been selected to extend Lock/pause period (decision 514). If an option has been selected to extend Lock/pause period (yes, at decision 514), one or more document attributes that indicate the lock/pause status of the document are modified (operation 516) and the lock/pause period is extended for a fixed period of time. The process waits for a substantial portion of a Lock/Pause period associated with the selected object to be completed and again decides whether a substantial portion of a Lock/Pause period associated with the selected object has been completed (decision 510).

If an option has not been selected to extend Lock/pause period (no, at decision 514), a determination is made regarding whether the Lock/Pause period has expired (decision 518). If the Lock/pause period has not expired (no at decision 518), the document remains locked/paused for edits and the process continues to wait until the lock/pause period expires. If the Lock/pause period has expired (yes at decision 518), then the one or more document attributes are modified to indicate that the document is no longer locked/paused for editing (operation 520).

Figure 6:
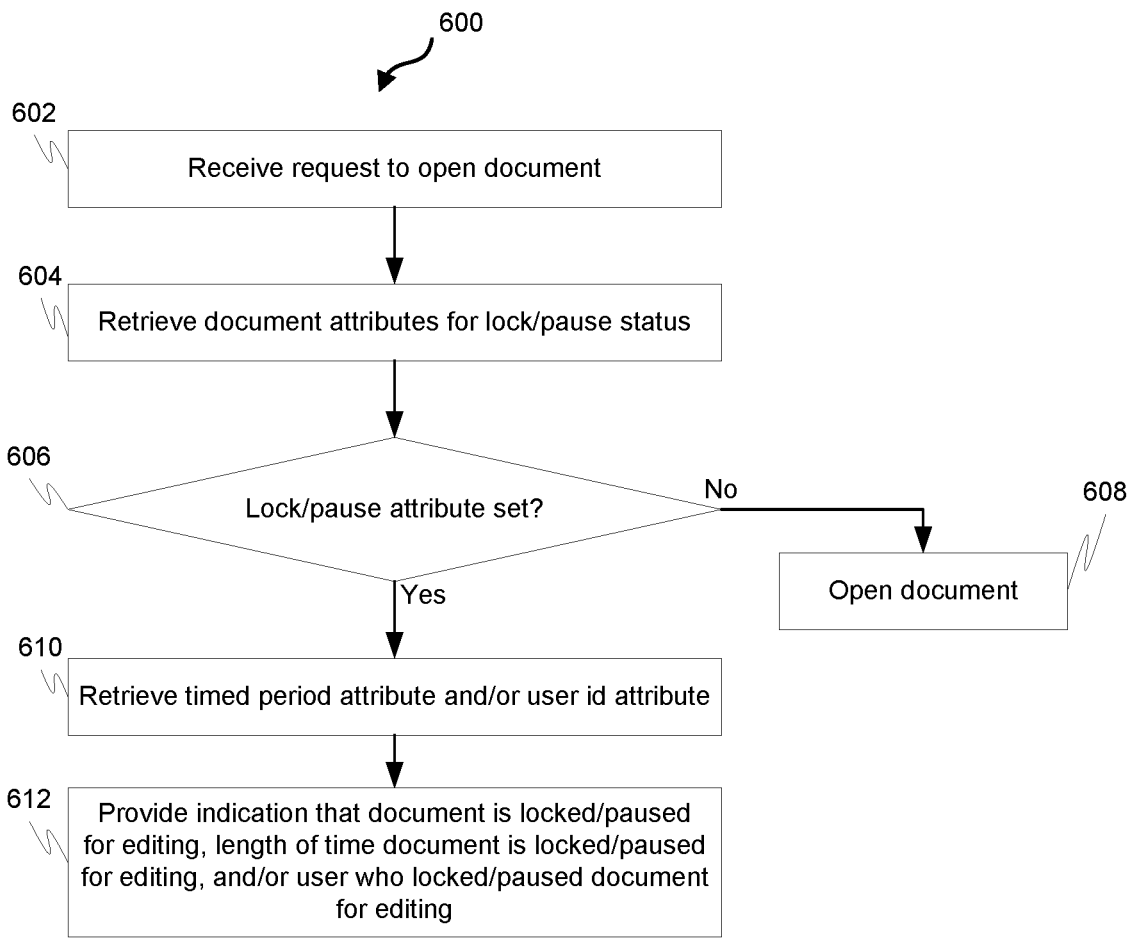
FIG. 6 is a process flow chart depicting an example process 600 is an example collaborative application to determine the lock or pause status of a collaborative document, in accordance with some embodiments.

FIG. 6 is a process flow chart depicting an example process 600 is an example collaborative application to determine the lock or pause status of a collaborative document. The order of operation within the example process 600 is not limited to the sequential execution as illustrated in the figure, but may be performed in one or more varying orders as applicable and in accordance with the present disclosure.

A request to open a document is received (operation 602). Before opening the document, the application can retrieve document attributes regarding the lock/pause status of the document (operation 604). A determination is made regarding whether a lock/pause attribute is set (decision 606). If the lock/pause attributes indicate that the document is not locked or paused for edits (no at decision 606), the document is opened (operation 608). If the lock/pause attributes indicate that the document is locked or paused for edits (yes at decision 606), the timed period attribute and/or user id attribute are retrieved (operation 610). An indication that document is locked/paused for editing, fixed length of time document is locked/paused for editing, and/or user who locked/paused document for editing can be provided via the user interface (operation 612).

Figure 7:
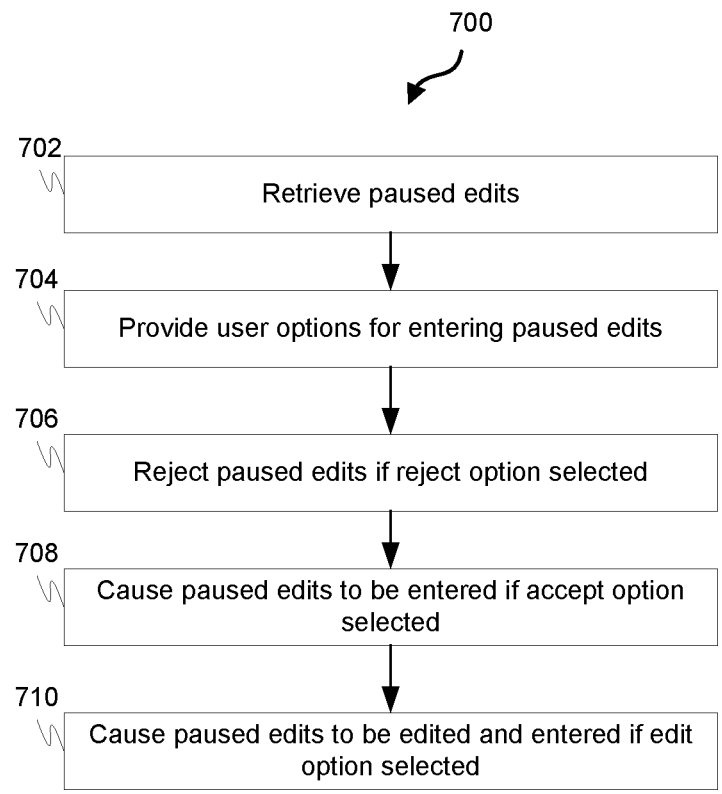
FIG. 7 is a process flow chart depicting an example process 700 for processing paused edits entered for an example document while the example document was paused for edits, in accordance with some embodiments.

FIG. 7 is a process flow chart depicting an example process 700 for processing paused edits entered for an example document while the example document was paused for edits. The order of operation within the example process 700 is not limited to the sequential execution as illustrated in the figure, but may be performed in one or more varying orders as applicable and in accordance with the present disclosure.

When the pause period ends, paused edits may be retrieved (operation 702). The paused edits may be retrieved from a queue used to save third party edits of documents that have been paused for edits. The saved paused edits may be provided to a user interface for review.

User options may be provided for processing the paused edits (operation 704). The provided user options may include an option to accept, reject or modify the paused edits. The paused edits may be rejected if a reject option has been selected (operation 706). The paused edits may be entered into the formerly paused document if the accept option has been selected (operation 708). The paused edits may be edited and entered if the edit option has been selected (operation 710).

FIG. 8 is a schematic block diagram of an example computer system that can be used to implement the techniques and methods described herein. The example computer system can include one or more processing system(s) 802, main memory 804, a network interface device (NID) 810, a chipset 812, a hard disk 813 and hard disk controller 815, input systems 816, and output systems 818.

The chipset 812 is usually located on a motherboard and is a set of electronic components (e.g., in an integrated circuit) that interconnects and manages the data flow between the processing system(s) 802 and other elements of the computer system and connected peripherals. For instance, the chipset 812 provides an interface between the processing system(s) 802 and the main memory 804, and also includes functionality for providing network connectivity through the NID 810, such as a gigabit Ethernet adapter. The chipset 812 typically contains the processor bus interface (also known as a front-side bus), memory controllers, bus controllers, I/O controllers, etc.

Processing system(s) 802 represents one or more general-purpose processing devices such as a microprocessor, central processing unit, or the like. More particularly, the processing system(s) 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 802 may also be one or more special-purpose processing devices such as an application specific integrated circuit (ASIC), a field programmable gate array (FPGA), a digital signal processor (DSP), network processor, or the like.

The processing system(s) 802 can include one or more central processing units (CPUs) that operate in conjunction with the chipset 812. The processing system(s) 802 perform arithmetic and logical operations necessary for the operation of the example computer system.

The NID 810 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 816 (or input device(s)) allow a user to input information to the computer system and can include things such as a keyboard, a mouse or other cursor pointing device, a pen, a voice input device, a touch input device, a webcam device, a microphone, etc. Output system(s) 818 (or output device(s)) present information to the user of the computer system and can include things such as a display, monitor, speakers, or the like.

The chipset 812 can provide an interface to various forms of computer-readable storage media including a main memory 804 (e.g., read-only memory (ROM), flash memory, dynamic random access memory (DRAM) such as synchronous DRAM (SDRAM)), and hard disk 813. The processing system(s) 802 can communicate with the various forms of computer-readable storage media via the chipset 812 and appropriate buses.

A hard disk 813 is a form of non-volatile memory that can store an operating system (OS) 814. The operating system 814 is software that is copied into RAM and executed by the processing system(s) 802 to control the operation of the example computer system, manage computer hardware and software resources, and provide common services for computer programs executed by the processing system(s) 802. Regardless of the implementation, the operating system 814 includes many different "components" that make the different parts of the example computer system work together. The disk controller 815 is the controller circuit which enables the processing system 802 to communicate with a hard disk 813, and provides an interface between the hard disk 813 and the bus connecting it to the rest of the system.

The main memory 804 may be composed of many different types of memory components. The main memory 804 can include non-volatile memory (such as read-only memory (ROM) 806, flash memory, etc.), volatile memory (such as random access memory (RAM) 808), or some combination of the two. The RAM 808 can be any type of suitable random access memory including the various types of dynamic random access memory (DRAM) such as SDRAM, the various types of static RAM (SRAM). The main memory 804 (as well as the processing system(s) 802) may be distributed throughout the example computer system.

The ROM 806 of the main memory 804 can be used to store firmware that includes program code containing the basic routines that help to start up the example computer system and to transfer information between elements within the example computer system. The ROM of the main memory 804 may also store other software components necessary for the operation of the example computer system.

The RAM 808 stores programs/instructions 830 or executable code for one or more programs 834 that can be loaded and executed at processing system(s) 802 to perform various functions. The programs/instructions 830 are computer readable program code that can be stored in RAM 808 (or other a non-transitory computer readable medium of the example computer system) that can be read and executed by processing system(s) 802 to perform various acts, tasks, functions, and steps as described herein. The methods and techniques described herein can be captured in programming instructions 830 for execution by the processing system 802 to cause the example computer system to perform the described methods, processes, and techniques.

The subject matter described herein discloses apparatus, systems, techniques and articles for improving the functioning of computer systems that allow for real-time collaborative editing of documents. The subject matter described herein discloses apparatus, systems, techniques and articles for applying a time-based lock (e.g., accessibility lock) on a collaborative document. The accessibility lock can provide a user with exclusive editing rights to the document for a period of time (e.g., accessibility lock period) and can alert other team members when someone using an accessibility tool (such as a screen reader) is accessing (e.g., editing) the document. The subject matter described herein also discloses apparatus, systems, techniques and articles for applying a time-based pause function (e.g., accessibility pause) on a collaborative document. The accessibility pause, while not providing exclusive editing rights to a user, can delay and save collaborative changes to a collaborative document in a queue for a period of time (e.g., accessibility pause period) while the user accesses the document and stream the saved collaborative changes to the user for acceptance, rejection or editing when the user is ready to receive and/or review the changes.

In one embodiment, a computer-implemented method in a document editing module is provided. The document editing module comprises a processor configured by programming instructions encoded in non-transient computer readable media. The method comprises providing, by the processor, contents of a document to a user interface; providing via the user interface, by the processor, an object that when selected indicates a desire to lock the document from editing by another document editing module or another instance of the document editing module for a fixed time period, the length of the fixed time period being determined prior to the document being locked for editing; and modifying, by the processor, one or more attributes of the document that indicate that the document is locked for editing and a fixed length of time the document is locked for editing that is determined prior to the document being locked for editing when the object has been selected.

These aspects and other embodiments may include one or more of the following features. The user interface may comprise a screen reader. The object may comprise a non-visual indicator. The non-visual indicator may comprise an audible indicator or a tactile indicator. The tactile indicator may comprise a braille indicator. The method may further comprise providing to the user interface, by the processor, a second object that when selected indicates a desire to: pause the document from editing by a second document editing module or a second instance of the document editing module for a second fixed time period; and save proposed edits to the document by the second document editing module or the second instance of the document editing module in a queue. The method may further comprise modifying the one or more attributes of the document to indicate: the document is locked or paused for editing; a fixed length of time the document is locked or paused for editing; and an indication of a user who locked or paused the document for editing. The method may further comprise entering the proposed edits into the document after the second fixed time period has expired when the second object has been selected. The method may further comprise: receiving the proposed edits saved in the queue, after the second fixed time period has expired; providing the saved proposed edits to the user interface; and providing an option to accept, reject or modify the proposed edits. The method may further comprise: entering the proposed edits into the document when the option to accept the proposed edits has been selected; rejecting the proposed edits when the option to reject the proposed edits has been selected; and receiving modified proposed edits when the option to modify the proposed edits has been selected and entering the modified proposed edits into the document. The method may further comprise: providing to the user interface an indication of how much time remains in the second fixed time period after at least half of the second fixed time period has elapsed and prior to the expiration of the second fixed time period; providing to the user interface a selectable option to extend the second fixed time period after providing the indication of how much time remains in the second fixed time period; and extending the second fixed time period when the option to extend the second fixed time period has been selected. The method may further comprise: providing to the user interface an indication of how much time remains in the first fixed time period after at least half of the first fixed time period has elapsed and prior to the expiration of the first fixed time period; providing to the user interface a selectable option to extend the first fixed time period after providing the indication of how much time remains in the first fixed time period; and extending the first fixed time period when the option to extend the first fixed time period has been selected. The one or more document attributes may be stored as metadata.

In another embodiment, an accessibility module configured to cooperate with a document editing module is provided. The accessibility module comprises a processor configured by programming instructions encoded in non-transient computer readable media. The accessibility module is configured to provide contents of a document accessed by the document editing module to a screen reader; provide via the screen reader a non-visual object that when selected indicates a desire to lock the document from editing by another document editing module or another instance of the document editing module for a fixed time period, the length of the fixed time period being determined prior to the document being locked for editing; and modify one or more attributes of the document that indicate that the document is locked for editing and a fixed length of time the document is locked for editing that is determined prior to the document being locked for editing when the non-visual object has been selected.

These aspects and other embodiments may include one or more of the following features. The non-visual object may comprise an audible indicator or a tactile indicator. The tactile indication may comprise a braille indicator. The accessibility module may be further configured to provide to the screen reader a second object that when selected indicates a desire to: pause the document from editing by a second document editing module or a second instance of the document editing module for a second fixed time period; and save proposed edits to the document by the second document editing module or the second instance of the document editing module in a queue. The accessibility module may be further configured to: modify one or more attributes of the document that indicate that the document is paused for editing and a fixed length of time the document is paused for editing when the second object has been selected; and enter the proposed edits into the document after the second fixed time period has expired when the second object has been selected. The accessibility module may be further configured to: receive the proposed edits saved in the queue after the second fixed time period has expired; provide the saved proposed edits to the user interface; and provide an option to accept, reject or modify the proposed edits. The accessibility module may be further configured to: enter the proposed edits into the document when the option to accept the proposed edits has been selected; reject the proposed edits when the option to reject the proposed edits has been selected; and receive modified proposed edits when the option to modify the proposed edits has been selected and entering the modified proposed edits into the document. The accessibility module may be further configured to: provide to the user interface an indication of how much time remains in the first fixed time period after at least half of the first fixed time period has elapsed and prior to the expiration of the first fixed time period; provide to the user interface a selectable option to extend the first fixed time period after providing the indication of how much time remains in the first fixed time period; extend the first fixed time period when the option to extend the first fixed time period has been selected; provide to the user interface an indication of how much time remains in the second fixed time period after at least half of the second fixed time period has elapsed and prior to the expiration of the second fixed time period; provide to the user interface a selectable option to extend the second fixed time period after providing the indication of how much time remains in the second fixed time period; and extend the second fixed time period when the option to extend the second fixed time period has been selected.

In another embodiment, a non-transitory computer readable storage medium embodying programming instructions configurable to perform a method is provided. The method comprises: providing contents of a document accessed by a document editing module to a screen reader; providing via the screen reader a non-visual object that when selected indicates a desire to lock the document from editing by another document editing module or another instance of the document editing module for a fixed time period, the length of the fixed time period being determined prior to the document being locked for editing; and modifying one or more attributes of the document that indicate that the document is locked for editing and a fixed length of time the document is locked for editing that is determined prior to the document being locked for editing when the non-visual object has been selected.

These aspects and other embodiments may include one or more of the following features. The method may further comprise: pausing the document from editing by a second document editing module or a second instance of the document editing module for a second fixed time period; and saving proposed edits to the document by the second document editing module or the second instance of the document editing module in a queue.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. An accessibility module for use with a document editor and a screen reader, the accessibility module comprising a processor configured by programming instructions encoded in non-transient computer readable media, the accessibility module configured to:

after contents of a document accessed by a first document editor have been provided to a screen reader, provide via the screen reader a non-visual lock object and a non-visual pause object for selection by a user of the screen reader, the non-visual lock object when selected indicating that the document is to be locked from editing by a different document editor or document editor instance for a first pre-determined time period, the non-visual pause object when selected indicating that the document is to enter an accessibility pause state for a second pre-determined time period during which a different document editor or document editor instance may not enter edits into the document but have proposed edits saved in a queue;

responsive to receiving a selection of the non-visual pause object, cause the document to enter the accessibility pause state for the second pre-determined time period during which a different document editor or document editor instance may not enter edits into the document but have proposed edits saved in the queue and indicate that a user of a screen reader caused the document to enter the accessibility pause state; and responsive to expiration of the second pre-determined time period, cause the document to leave the accessibility pause state, receive proposed edits entered into the queue by a different document editor or document editor instance while the document was in the accessibility pause state, and enter received proposed edits into the document.

2. The accessibility module of claim 1, wherein the non-visual lock object comprises an audible indicator or a tactile indicator and the non-visual pause object comprises an audible indicator or a tactile indicator.

3. The accessibility module of claim 1, wherein to cause the document to enter the accessibility pause state and to indicate that a user of a screen reader caused the document to enter the accessibility pause state, the accessibility module is configured to modify a pause document attribute to indicate to a document editor or document editor instance other than the first document editor that the document is in the accessibility pause state, and modify a user ID document attribute to indicate that the user of a screen reader caused the document to enter the accessibility pause state.

4. The accessibility module of claim 3, wherein to cause the document to enter the accessibility pause state for the second pre-determined time period, the accessibility module is configured to modify a timer attribute to indicate a length of time for the second pre-determined time period.

5. The accessibility module of claim 3, wherein to cause the document to leave the accessibility pause state, the accessibility module is configured to modify the pause document attribute to indicate to a document editor or document editor instance other than the first document editor that the document is no longer in the accessibility pause state.

6. The accessibility module of claim 1, further configured to cause, responsive to receiving a selection of the non-visual lock object, the document to be locked for editing by a different document editor or document editor instance for the first pre-determined time period and indicate that a user of a screen reader caused the document to be locked for editing.

7. The accessibility module of claim 6, wherein to cause the document to be locked for editing by a different document editor or document editor instance and to indicate that a user of a screen reader caused the document to be locked for editing, the accessibility module is configured to modify a lock document attribute to indicate to a document editor or document editor instance other than the first document editor that the document is locked for editing and modify a user ID document attribute to indicate that the user of a screen reader locked the document.

8. The accessibility module of claim 7, wherein to cause the document to be locked for editing by a different document editor or document editor instance for the first pre-determined time period, the accessibility module is configured to modify a timer attribute to indicate a length of time for the first pre-determined time period.

9. The accessibility module of claim 6, further configured, responsive to expiration of the first pre-determined time period, to cause the document to no longer be locked for editing by a different document editor or document editor instance.

10. The accessibility module of claim 9, wherein to cause the document to no longer be locked for editing, the accessibility module is configured to modify the lock document attribute to indicate to a document editor or document editor instance other than the first document editor that the document is no longer locked for editing.

11. The accessibility module of claim 1, wherein to enter the received proposed edits into the document, the accessibility module is configured to provide an option to accept, reject or modify the proposed edits.

12. The accessibility module of claim 11, wherein to enter the received proposed edits into the document, the accessibility module is further configured to enter the proposed edits into the document when the option to accept the proposed edits has been selected, reject the proposed edits when the option to reject the proposed edits has been selected, and receive and enter modified proposed edits into the document when the option to modify the proposed edits has been selected.

13. The accessibility module of claim 6, further configured to:
provide to a user interface an indication of how much time remains in the first pre-determined time period after at least half of the time in the first pre-determined time period has elapsed and prior to the expiration of the first pre-determined time period;
provide to the user interface a selectable option to extend the first pre-determined time period after providing the indication of how much time remains in the first pre-determined time period; and
extend the first pre-determined time period when the option to extend the first pre-determined time period has been selected.

14. The accessibility module of claim 1, further configured to:
provide to a user interface an indication of how much time remains in the second pre-determined time period after at least half of the time in the second pre-determined time period has elapsed and prior to the expiration of the second pre-determined time period;
provide to the user interface a selectable option to extend the second pre-determined time period after providing the indication of how much time remains in the second pre-determined time period; and
extend the second pre-determined time period when the option to extend the second pre-determined time period has been selected.

15. A computer-implemented method in a document editor, the document editor comprising a processor configured by programming instructions encoded in non-transient computer readable media, the method comprising:
providing, via a screen reader, a non-visual lock object and a non-visual pause object for selection by a user of the screen reader, the non-visual lock object when selected indicating that the document is be locked from editing by a different document editor or document editor instance for a first pre-determined time period, the non-visual pause object when selected indicating that the document is to enter an accessibility pause state for a second pre-determined time period during which a different document editor or document editor instance may not enter edits into the document but have proposed edits saved in a queue;
when a selection of the non-visual pause object is received, causing the document to enter the accessibility pause state for the second pre-determined time period during which a different document editor or document editor instance may not enter edits into the document but have proposed edits saved in the queue, and indicating that a user of a screen reader caused the document to enter the accessibility pause state; and
when the second pre-determined time period expires, causing the document to leave the accessibility pause state, receiving proposed edits entered into the queue by a different document editor or document editor instance while the document was in the accessibility pause state, and entering received proposed edits into the document.

16. The computer-implemented method of claim 15, further comprising:

when a selection of the non-visual lock object is received, causing the document to be locked for editing by a different document editor or document editor instance for the first pre-determined time period and indicating that a user of a screen reader caused the document to be locked for editing; and when the first pre-determined time period expires, causing the document to no longer be locked for editing by a different document editor or document editor instance.

17. The computer-implemented method of claim 15, wherein entering received proposed edits into the document comprises providing an option to accept, reject or modify the proposed edits.

18. The computer-implemented method of claim 17, wherein entering received proposed edits into the document comprises entering the proposed edits into the document when the option to accept the proposed edits has been selected, rejecting the proposed edits when the option to reject the proposed edits has been selected, and receiving and entering modified proposed edits into the document when the option to modify the proposed edits has been selected.

19. A non-transitory computer readable storage medium embodying programming instructions configurable to perform a method, the method comprising:

providing, via a screen reader, a non-visual lock object and a non-visual pause object for selection by a user of the screen reader, the non-visual lock object when selected indicating that the document is be locked from editing by a different document editor or document editor instance for a first pre-determined time period, the non-visual pause object when selected indicating that the document is to enter an accessibility pause state for a second pre-determined time period during which a different document editor or document editor instance may not enter edits into the document but have proposed edits saved in a queue;

when a selection of the non-visual pause object is received, causing the document to enter the accessibility pause state for the second pre-determined time period during which a different document editor or document editor instance may not enter edits into the document but have proposed edits saved in the queue, and indicating that a user of a screen reader caused the document to enter the accessibility pause state; and when the second pre-determined time period expires, causing the document to leave the accessibility pause state, receiving proposed edits entered into the queue by a different document editor or document editor instance while the document was in the accessibility pause state, and entering received proposed edits into the document.

20. The non-transient computer readable media of claim 19 wherein the method further comprises:

when a selection of the non-visual lock object is received, causing the document to be locked for editing by a different document editor or document editor instance for the first pre-determined time period and indicating that a user of a screen reader caused the document to be locked for editing; and when the first pre-determined time period expires, causing the document to no longer be locked for editing by a different document editor or document editor instance.

* * * * *